(12) United States Patent
Clift et al.

(10) Patent No.: US 9,173,000 B2
(45) Date of Patent: Oct. 27, 2015

(54) AUTOMATIC DISCOVERY AND MIRRORING OF SERVER-CLIENT REMOTE USER INTERFACE (RUI) SESSION ON A COMPANION DEVICE AND SYNCHRONOUSLY CONTROLLING BOTH SESSIONS USING RUI ON COMPANION DEVICE

(71) Applicant: SONY CORPORATION, Tokyo (JP)

(72) Inventors: Graham Clift, Poway, CA (US); Jenke Wu Kuo, San Diego, CA (US)

(73) Assignee: Sony Corporation, Tokyo (JP)

( * ) Notice: Subject to any disclaimer, the term of this patent is extended or adjusted under 35 U.S.C. 154(b) by 294 days.

(21) Appl. No.: 13/861,610

(22) Filed: Apr. 12, 2013

(65) Prior Publication Data
US 2014/0310599 A1    Oct. 16, 2014

(51) Int. Cl.
| | | |
|---|---|---|
| *G06F 3/00* | (2006.01) |
| *G06F 3/048* | (2013.01) |
| *H04N 21/472* | (2011.01) |
| *G06F 3/0484* | (2013.01) |
| *H04N 21/41* | (2011.01) |
| *H04N 21/4227* | (2011.01) |
| *G06F 15/177* | (2006.01) |
| *G06F 9/44* | (2006.01) |
| *H04N 21/482* | (2011.01) |

(52) U.S. Cl.
CPC ............ *H04N 21/472* (2013.01); *G06F 3/0484* (2013.01); *H04N 21/4126* (2013.01); *H04N 21/4227* (2013.01); *G06F 9/4445* (2013.01); *H04N 21/482* (2013.01)

(58) Field of Classification Search
None
See application file for complete search history.

(56) References Cited

U.S. PATENT DOCUMENTS

| | | | |
|---|---|---|---|
| 6,466,779 B1 | 10/2002 | Moles et al. | |
| 7,360,232 B2 | 4/2008 | Mitchell | |
| 7,477,321 B2 * | 1/2009 | Yokoyama et al. | 348/553 |
| 7,627,341 B2 | 12/2009 | Wu | |
| 7,634,263 B2 | 12/2009 | Louch et al. | |
| 7,673,316 B2 | 3/2010 | Incentis Carro | |
| 8,010,987 B2 | 8/2011 | Nygaard et al. | |
| 8,255,553 B2 * | 8/2012 | Dong et al. | 709/231 |
| 8,266,666 B2 | 9/2012 | Friedman | |
| 8,307,395 B2 | 11/2012 | Issa et al. | |
| 8,341,289 B2 | 12/2012 | Hellhake et al. | |
| 8,863,196 B2 | 10/2014 | Patil et al. | |

(Continued)

FOREIGN PATENT DOCUMENTS

WO    WO2014003781 A1 *    1/2014

OTHER PUBLICATIONS

"Turn iPhone into TV remote with Beacon Device", http://www.alltechnologynews.com/turn-iphone-into-tv-remote-with-beacon-device.html, Jan. 17, 2011.

(Continued)

*Primary Examiner* — Yongjia Pan
(74) *Attorney, Agent, or Firm* — John L. Rogitz

(57) ABSTRACT

A server sends to a video device such as a TV a remote user interface (RUI) that is presented on the TV and manipulable to send control commands back to the server. A companion device such as a tablet computer discovers the RUI session and is provided by the server with its own RUI, which mirrors that on the TV, modified as appropriate for the screen of the companion device. The server maintains the two RUIs synchronized such that the RUI on the companion mirrors the RUI on the TV.

20 Claims, 4 Drawing Sheets

(56) References Cited

U.S. PATENT DOCUMENTS

| | | | |
|---|---|---|---|
| 2004/0047599 A1 | 3/2004 | Grzeczkowski | |
| 2005/0028208 A1 | 2/2005 | Ellis et al. | |
| 2005/0086447 A1 | 4/2005 | Miyamoto et al. | |
| 2005/0120381 A1 | 6/2005 | Yamaguchi | |
| 2005/0138192 A1 | 6/2005 | Encarnacion et al. | |
| 2005/0177861 A1 | 8/2005 | Ma et al. | |
| 2005/0240660 A1* | 10/2005 | Sakao et al. | 709/219 |
| 2005/0251823 A1 | 11/2005 | Saarikivi | |
| 2005/0251827 A1 | 11/2005 | Ellis et al. | |
| 2005/0262542 A1 | 11/2005 | DeWeese et al. | |
| 2006/0031779 A1* | 2/2006 | Theurer et al. | 715/781 |
| 2006/0041916 A1 | 2/2006 | McQuaide, Jr. | |
| 2006/0041923 A1 | 2/2006 | McQuaide | |
| 2006/0140170 A1* | 6/2006 | Dorner | 370/352 |
| 2006/0161635 A1 | 7/2006 | Lamkin et al. | |
| 2006/0190966 A1 | 8/2006 | McKissick et al. | |
| 2006/0270452 A1 | 11/2006 | Gerzberg | |
| 2006/0271968 A1 | 11/2006 | Zellner | |
| 2007/0157281 A1 | 7/2007 | Ellis et al. | |
| 2007/0180382 A1* | 8/2007 | Kortum et al. | 715/716 |
| 2008/0148331 A1 | 6/2008 | Walter et al. | |
| 2008/0163330 A1 | 7/2008 | Sparrell | |
| 2008/0301729 A1* | 12/2008 | Broos et al. | 725/38 |
| 2009/0019492 A1 | 1/2009 | Grasset | |
| 2009/0089742 A1* | 4/2009 | Nagulu et al. | 717/106 |
| 2009/0119604 A1* | 5/2009 | Simard et al. | 715/757 |
| 2009/0233629 A1 | 9/2009 | Jayanthi | |
| 2010/0011299 A1* | 1/2010 | Brodersen et al. | 715/740 |
| 2010/0031299 A1 | 2/2010 | Harrang et al. | |
| 2011/0202854 A1* | 8/2011 | Chan et al. | 715/762 |
| 2011/0209177 A1* | 8/2011 | Sela et al. | 725/39 |
| 2011/0314173 A1* | 12/2011 | Lyu | 709/231 |
| 2012/0117168 A1 | 5/2012 | Sugiyama et al. | |
| 2012/0162536 A1* | 6/2012 | Sibilsky et al. | 348/734 |
| 2013/0086166 A1* | 4/2013 | Findlay et al. | 709/204 |
| 2013/0088629 A1* | 4/2013 | Ryu | 348/333.01 |
| 2013/0176491 A1* | 7/2013 | Kataoka et al. | 348/552 |
| 2013/0212629 A1* | 8/2013 | Chien et al. | 725/61 |
| 2013/0251336 A1* | 9/2013 | Roberts et al. | 386/234 |
| 2014/0028707 A1* | 1/2014 | Kapoor | 345/629 |
| 2014/0189602 A1* | 7/2014 | Wang et al. | 715/863 |

OTHER PUBLICATIONS

Peel TV App converts iPhone into remote control, http://www.protectyourbubble.com/insurance-news/peel-tv-app-converts-iphone-into-remote-control-539.html, search dated Feb. 4, 2011.

Abhishek Patil, Sriram Sampathkumaran, Guru Prashanth Balasubramanian, Dipendu Saha, Meeta Jain, Aravind Babu Asam, Seugwook Hong, "Enhanced Information on Mobile Device for Viewed Program and Control of Internet TV Device Using Mobile Device" file history of related U.S. Appl. No. 13/248,566, filed Sep. 29, 2011.

Abhishek Patil, Sriram Sampathkumaran, Guru Prashanth Balasubramanian, Dipendu Saha, Meeta Jain, Aravind Babu Asam, Seugwook Hong, "Enhanced Information on Mobile Device for Viewed Program and Control of Internet TV Device Using Mobile Device" file history for related pending U.S. Appl. No. 13/921,465, filed Jun. 19, 2013.

Abhishek Patil, Sriram Sampathkumaran, Guru Prashanth Balasubramanian, Dipendu Saha, Meeta Jain, Aravind Babu Asam, Seungwook Hong, "enhanced Information on Mobile Device for Viewed Program and Control of Internet TV Device Using Mobile Device" related U.S. Appl. No. 13/248,566, final office action dated May 17, 2013.

* cited by examiner

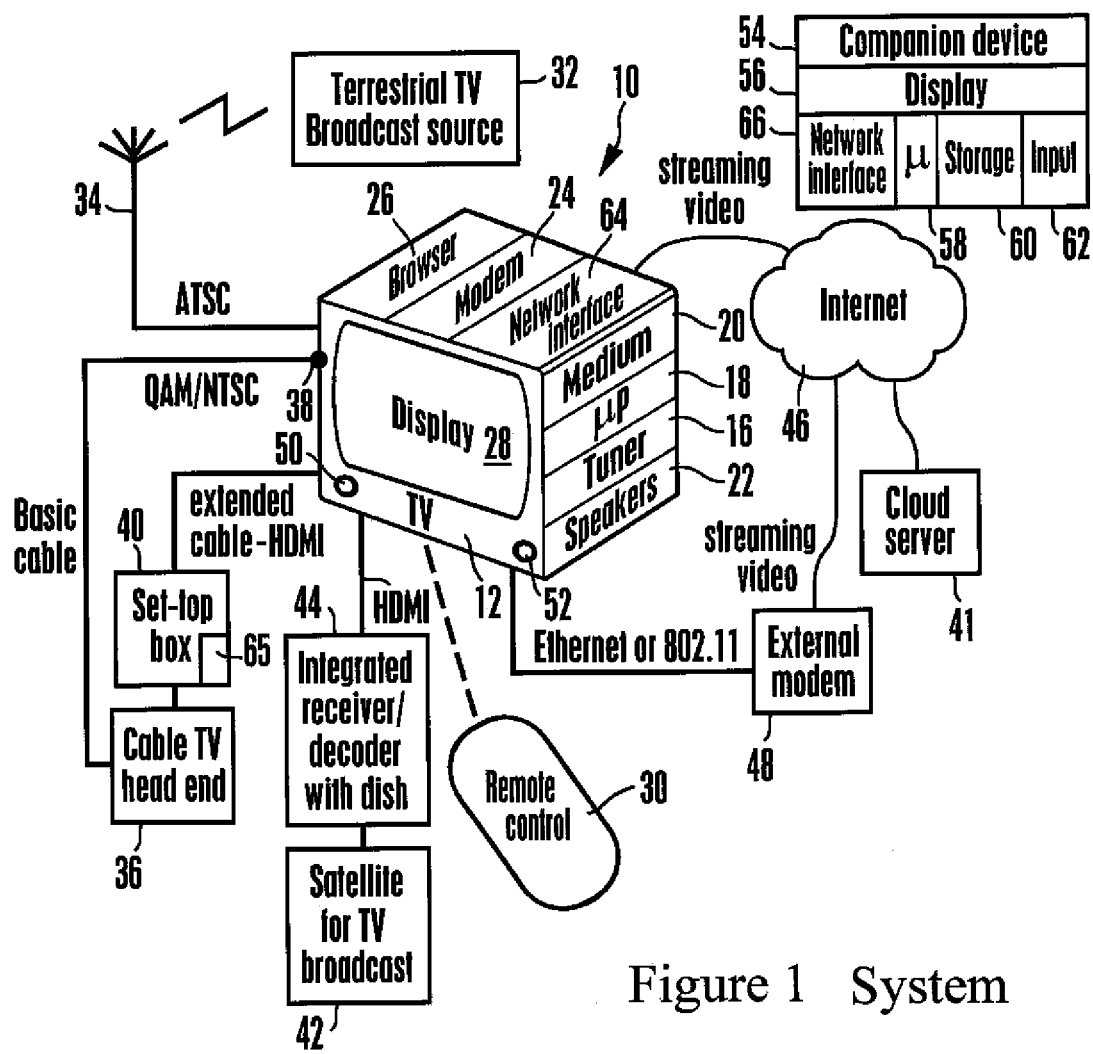
Figure 1    System

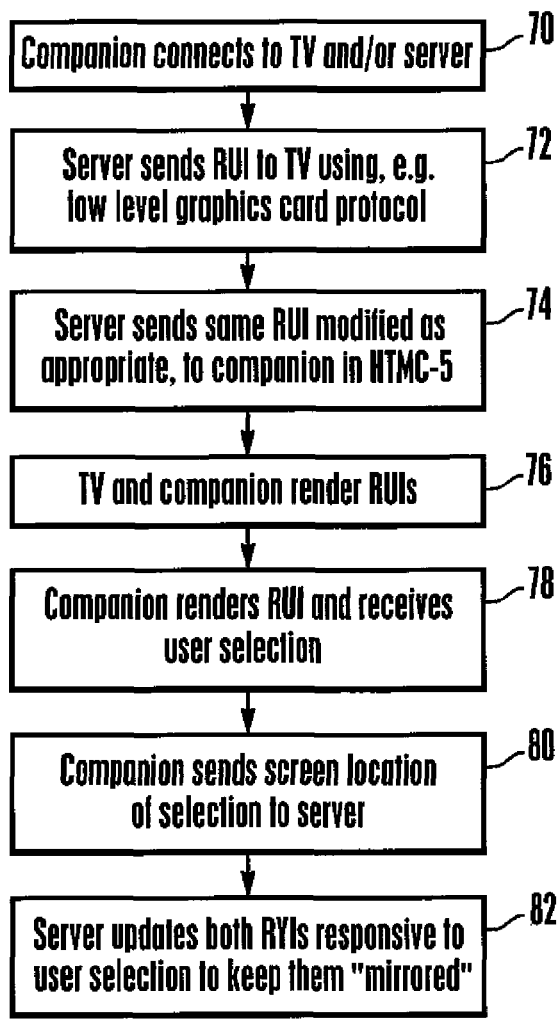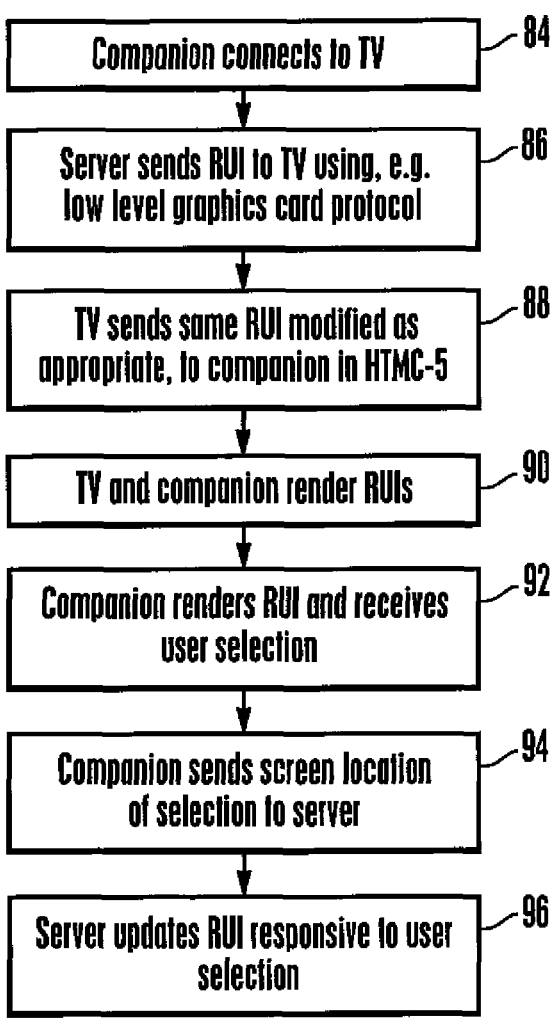

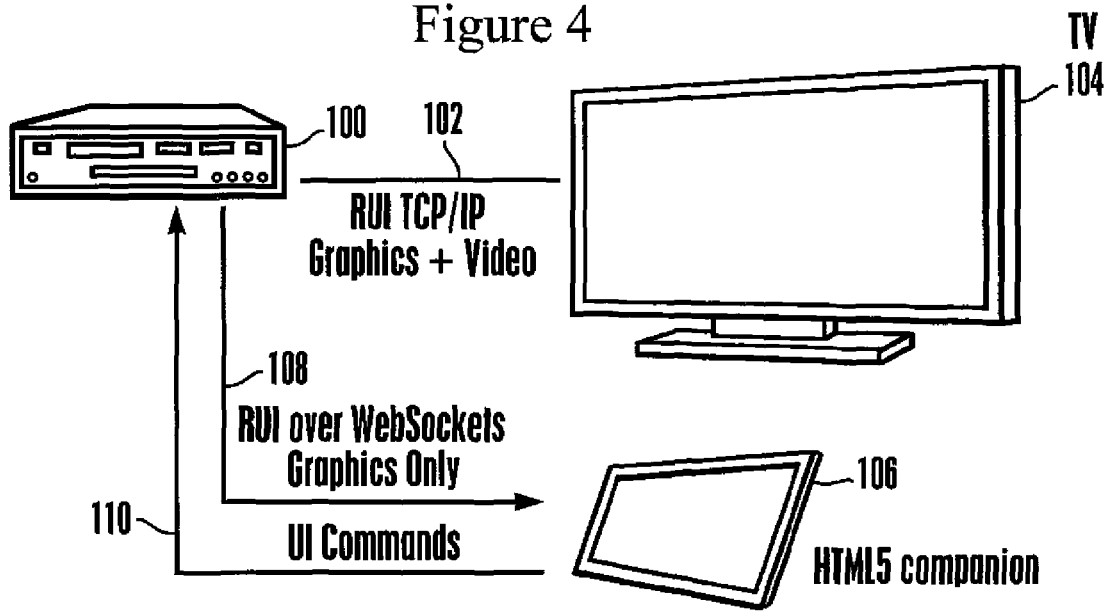
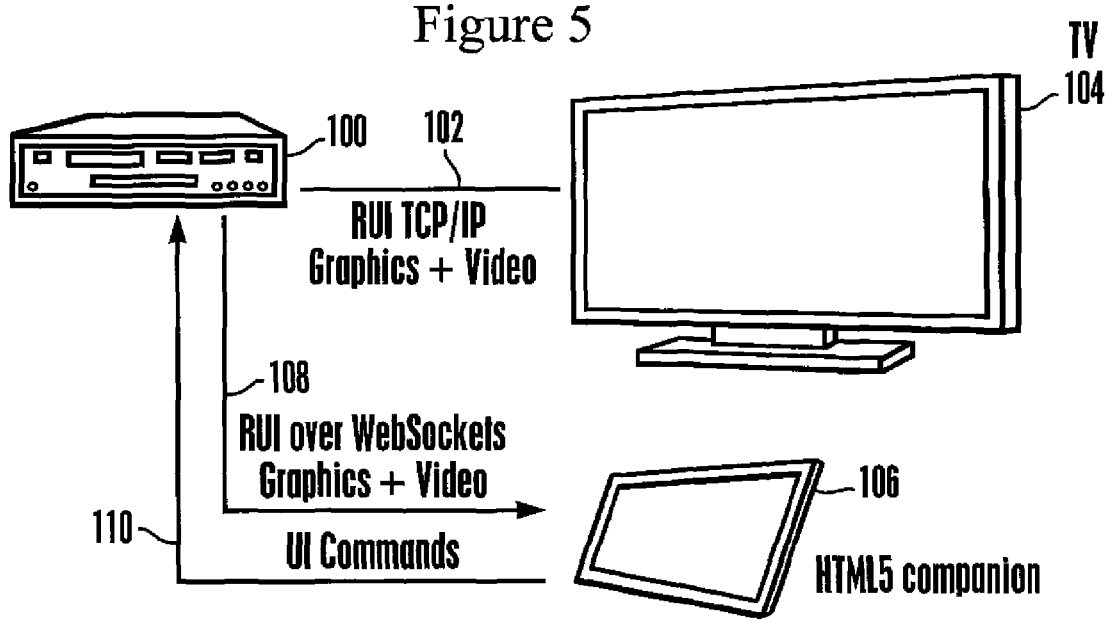

Figure 6
Figure 7
Figure 8
Figure 9

AUTOMATIC DISCOVERY AND MIRRORING OF SERVER-CLIENT REMOTE USER INTERFACE (RUI) SESSION ON A COMPANION DEVICE AND SYNCHRONOUSLY CONTROLLING BOTH SESSIONS USING RUI ON COMPANION DEVICE

FIELD OF THE INVENTION

The present application relates generally to constraining the availability of real time and non-real time (NRT) content to the geographic locality of the broadcast TV signals that are associated with the RT content.

BACKGROUND OF THE INVENTION

Remote User Interfaces (RUI) are essentially user interfaces sent from a device to be controlled to a device intended to do the controlling for presentation on the intended controlling device as a graphical user interface. RUIs advantageously facilitate the implementation of user interfaces dynamically without having to pre-program the device intended to do the controlling with application graphics and input responses.

As understood herein, a larger rendering device such as a TV may be provided with an RUI from a server to allow a user of the TV to control the server using the remote commander of the TV to navigate and operate the RUI during a RUI "session". The server may implement functions of a set top box, as but one example, and the RUI may accordingly be an electronic programming guide (EPG) that permits establishing, during the session, the channel being shown on the TV.

As further understood herein, a user might happen to possess a companion device such as a tablet computer, smart phone, and the like while watching TV during the server-TV TV RUI session, and that controlling the server using that companion device, which typically has more functionality than a TV RC, may be desirable while the RUI session is in force between the other two components, namely, TV and server. However, as further understood herein, simply presenting multiple RUIs on multiple devices without linking them to keep them reconciled with each other is less than desirable.

SUMMARY OF THE INVENTION

A server provides a remote user interface (RUI) and video to a main screen during an RUI session, which also includes the status of the RUI. The main screen and the session to the main screen are discoverable by a companion device, which pairs with the main screen and/or server. Once the screens are paired at the server, the server mirrors the graphical part of the RUI of the session on both the main screen and on a new session the server creates on the companion device, which may only have a standard HTML5 browser. In this case, graphics presentation commands for the RUI sent from the server to the main screen are also translated into a protocol compatible with an application running on an HTML5 browser. This application is capable of producing the same graphical output on the companion device and can be downloaded from the server prior to starting the mirror session on the companion device or can be present on the companion device locally before starting the mirror session. The companion screen may have a touch screen. When the companion screen has a touch screen it can replace the need for a remote control on the main screen by providing touch commands directly on the RUI graphics. The companion device sends back the data for the touch or multi-touch to the server, which knows what RUI elements are positioned where on the companion device, processing the commands accordingly as if they came from the main screen.

The RUI can be, without limitation, based on the RVU protocol or X11 protocol or any custom protocol that supports server side scene graphics such that the server maintains the rendering control over the assembly of the graphics.

Accordingly, a companion device to an audio video display device (AVDD) includes a processor, a display presenting demanded images under control of the processor, and a computer readable storage medium bearing instructions executable by the processor to receive from a server information pertaining to rendering a remote user interface (RUI). A version of the RUI is presented on the AVDD. Display locations on the RUI are selectable by a user to send information correlatable to control commands back to the server. The companion device processor receives from the server updates to the RUI such that the RUI presented on the companion device is synchronized with the version presented on the AVDD.

In example embodiments the information pertaining to rendering the RUI is formatted for rendering the RUI in HTML5. In general, HTML5 is an example hypertext markup language that supports graphics rendering commands using vector graphics, in addition to bitmap graphics commands. The version of the RUI presented on the AVDD, however, need not be through an HTML5 client. Also, the RUI presented on the display of the companion device can be modified from the version presented on the AVDD as appropriate for the display of the companion device.

The instructions executable by the companion device processor can, if desired, cause the processor to establish communications with the server. The companion device may establish communications only with the AVDD and not the server, with the server information pertaining to rendering the RUI being received through the AVDD by the companion device.

In an example embodiment, the instructions executable by the processor cause the processor to execute, on an HTML5 base, a protocol application which transcodes the information pertaining to rendering the RUI to HTML5 graphics. The information pertaining to rendering the RUI received by the companion device can include extensible markup language (XML) commands and/or JavaScript Object Notation (JSON) formatted commands.

In another aspect, a server includes a processor and a computer readable storage medium accessible to the processor and bearing instructions which when executed by the processor cause the processor to send to an audio video display device (AVDD) a graphics rendering command to render, on a display of the AVDD, a remote user interface (RUI) containing one or more RUI elements. In synchronization with sending the graphics rendering command to the AVDD, the server sends to a companion device a corresponding graphics rendering command that causes the companion device to render the RUI or a substantially similar version thereof on a display of the companion device. By "substantially similar version" is meant a version of the RUI presented on the AVDD modified for the presentation capabilities of the companion device. The server processor receives from the companion device a user selection signal pertaining to the RUI, correlates the user selection signal to a control command, and executes the control command.

In another aspect, a method includes receiving, at an audio video display device (AVDD) and a companion device paired with the AVDD, graphics rendering commands to render on each device a respective remote user interface (RUI). The method also includes receiving, at both the AVDD and companion device, respective RUI modification commands to change the respective RUIs in synchronization with each other.

The details of the present invention, both as to its structure and operation, can be best understood in reference to the accompanying drawings, in which like reference numerals refer to like parts, and in which:

BRIEF DESCRIPTION OF THE DRAWINGS

FIG. 1 is a block diagram of a non-limiting example system in accordance with present principles;

FIG. 2 is a flow chart of example overall logic;

FIG. 3 is a flow chart of example alternate overall logic;

FIG. 4 is a block diagram of a first example implementation;

FIG. 5 is a block diagram of a second example implementation; and

FIGS. 6-9 are screen shots illustrating the results of present principles.

DETAILED DESCRIPTION OF THE PREFERRED EMBODIMENT

Referring initially to the non-limiting example embodiment shown in FIG. 1, a system 10 includes a client such as an audio video display device (AVDD) 12. The AVDD may be implemented by a TV including a TV tuner, 16 communicating with a processor 18 accessing a tangible computer readable storage medium 20 such as disk-based or solid state storage. The AVDD may also be implemented, by way of non-limiting example, a large tablet computer, a personal computer, an Internet Protocol (IP) TV such as the one shown in FIG. 1, etc.

The AVDD 12 can output audio on one or more speakers 22. In examples, the AVDD 12 can receive streaming video from the Internet using a built-in wired or wireless modem 24 communicating with the processor 12 which may execute a software-implemented implemented browser 26. Video is presented under control of the processor 18 on a display 28 such as but not limited to a high definition TV (HDTV) flat panel display, and may be a touch screen display. The display 28 may be a 40" or larger display. User commands to the processor 18 may be wirelessly received from a remote control (RC) 30 using, e.g., rf or infrared. Audio-video display devices other than a TV may be used, e.g., smart phones, game consoles, personal digital organizers, notebook computers and other types of computers, a networked Blu-ray or DVD player with HDMI output connected to a TV or monitor, a game console with HDMI output connected to a TV or monitor, an HDMI Stick with networking and processing capabilities connected to a TV or Monitor, a IP client STB connected by HDMI to TV or Monitor, etc.

TV programming from one or more terrestrial TV broadcast sources 32 as received by a terrestrial broadcast antenna 34 which communicates with the AVDD 12 may be presented on the display 28 and speakers 22. The terrestrial broadcast programming may conform to digital ATSC standards and may carry within it a terrestrial broadcast EPG, although the terrestrial broadcast EPG may be received from alternate sources, e.g., the Internet via Ethernet, or cable communication link, or satellite communication link.

TV programming from a cable TV head end 36 may also be received at the TV for presentation of TV signals on the display 28 and speakers 22. When basic cable only is desired, the cable from the wall typically carries TV signals in QAM or NTSC format and is plugged directly into the "F-type connector" 38 on the TV chassis in the U.S., although the connector used for this purpose in other countries may vary. In contrast, when the user has an extended cable subscription for instance, the signals from the head end 36 are typically sent through a STB 40 which may be separate from or integrated within the TV chassis but in any case which sends HDMI baseband signals to the TV. Other types of connections may be used, e.g., MOCA, USB, 1394 protocols, DLNA.

In an example implementation, the STB 40 may perform the role of the server described below. Other example components which may perform the role of server include a gateway device, a media server, a cloud-based server 41 communicating with the AVDD 12 over the Internet as shown and performing the function of, e.g., the STB 40, and a PC.

Similarly, HDMI baseband signals transmitted from a satellite source 42 of TV broadcast signals received by an integrated receiver/decoder (IRD) 44 associated with a home satellite dish may be input to the AVDD 12 for presentation on the display 28 and speakers 22. Also, streaming video may be received from the Internet 46 for presentation on the display 28 and speakers 22. The streaming video may be received at the computer modem 24 or it may be received at an in-home modem 48 that is external to the AVDD 12 and conveyed to the AVDD 12 over a wired or wireless Ethernet link and received at an RJ45 or 802.11x antenna on the TV chassis. Note that both broadcast TV programs on a schedule can be sent through any of the channels above along with augmented content, either real time or non-real time (NRT) content, as described further below.

Also, in some embodiments a video camera 50, which may be integrated in the chassis if desired or mounted separately and electrically connected thereto, may be connected to the processor 16 to provide to the processor 16 video images of viewers looking at the display 28. The video camera 50 may be provided with a wide angle lens. The video camera 50 may have its own camera processor communicating with the TV processor 18, or it may be a simple imaging devices such as a CCD or other imager that is controlled by the processor 18. Furthermore, a microphone 52 may be provided on the chassis or separate therefrom and can be electrically connected to the processor 16 to provide viewer-generated voice commands to the processor 16.

A companion device 54 may also be provided. Example embodiments of companion devices include but are not limited to tablet computers, or smart phones, PCs, or other mobile wireless computing device. The companion device may include a visual display 56 such as a touch screen display controlled by a companion processor 58 accessing one or more computer readable storage media 60 to execute present logic. Additional input devices 62 may be includes, such as but not limited to voice recognition devices, keypads, point and click devices, etc. The companion device 54 may communicate with a wireless network interface 64 of the AVDD 12 and with a wireless network interface 65 of the server, e.g., STB 40, using a companion device network interface 66. The interfaces 64, 65, 66 may be, without limitation, WiFi interfaces, Bluetooth interfaces, or other appropriate wireless communication interfaces including wireless telephony interfaces.

Now referring to FIG. 2, the companion device 54 connects ("pairs") with the AVDD 12 (referred to in the flow chart as "TV" for illustration only) and/or to the server, e.g., the cloud server 41, the STB 40, or other apparatus performing the server functions described herein. In a preferred embodiment the companion device 54 connects to the server. Although as described below in reference to FIG. 3 the companion device may connect only to the TV.

The connection of the companion device 54 to the server, which may be a wireless communication connection, preferably is automatic and is done by the companion device. The companion device may discover either the RUI being sent from the server to the AVDD 12, and/or the RUI session between the server and AVDD, or may itself initiate a first RUI session between the AVDD and server and a second RUI session between the companion device and server which mirrors the first RUI session between the AVDD and server.

Among the non-limiting ways this can be accomplished, the companion device can initiate communication using the Discovery and Launch (DIAL) protocol developed under the auspices of Netflix. For example, the companion device 54 can use the DIAL protocol to launch an RUI client application on the AVDD, and the AVDD in response establishes a communication connection to the server. The companion device 54 sends the RUI client on the AVDD an extra identifying parameter using DIAL, which in turn sends the identifying parameter to the server. The extra identifying parameter is interpreted by the server to mean that a client with the identity defined by the identifying parameter is connected to the server. The extra identifying parameter can indicate the model of the companion device, which the server can correlate to capabilities so as to appropriately modify the RUI for the display of the companion device, or the extra identifying parameter can indicate the capabilities directly.

Then the companion device 54 establishes communication with the server using the same identifying parameter, which is recognized by the server as indicating that a companion device is connected to the server, paired with the AVDD 12, and requiring a separate RUI that mirrors the RUI provided by the server to the AVDD 12.

Another approach is the server advertising its RUI on the network as well as any active sessions using Universal Plug-n-Play (UPnP), the "Bonjour" discovery feature provided by Apple, Inc., the "ZeroConf" feature provided by Microsoft Corp. The companion device 54 then connects to the instantiation of the active RUI session that is on the AVDD, therefore mirroring it.

Yet another approach is to provide a separate 'pairing registration screen' as part of the RUI. Once the user of the companion device 54 selects a device to pair to, the companion device so informs the server which in response sends to the companion device an RUI mirroring the RUI being sent from the server to the AVDD.

Moving to block 72, the server sends its RUI to the AVDD. In one non-limiting example, the RUI sent to the AVDD may be sent using a low level graphics card protocol via a transmission control protocol/Internet Protocol (TCP/IP) socket. This is because the RUI information sent to the AVDD (as well as the mirrored RUI information sent to the companion device 54) essentially simply defines how to render RUI elements on the rendering device, be it the AVDD 12 or companion device 54. The underlying functionality of the RUI elements, when selected, need not be known to the RUI client on the AVDD 12 or the RUI client on the companion device 54, but only to the server. Selection of an RUI element by a user results in the rendering device simply sending a signal back to the server indicating the screen location at which the selection occurred, which the server then correlates to the appropriate function underlying the selected RUI element. Another method is that some functionality to recognize the selection of a RUI element is available on the RUI client on the AVDD 12 or the RUI client on the companion device 54 and some processing is done on the RUI client to indicate the selection as well as sending a signal back to the server indicating the screen location at which the selection occurred, which the server then correlates to the appropriate function underlying the selected RUI element.

Proceeding to block 74, the server sends to the companion device 54 a second RUI which mirrors the first RUI sent to the AVDD 12, modified if desired as appropriate for the display of the companion device 54. In other words, instead of having exactly the same graphics on the companion device 54 as on the AVDD 12, the server can send a companion-optimized version to the companion device 54 that, for instance, omits a video picture window otherwise presented on the AVDD 12, or that has less text information, or that has extra text information, e.g., uniform resource locator (URL) hyperlinks to relevant information about a program, channel, or actress. The user experience on the companion device 54 still feels like a synchronized experience, however, since the general appearance and functionality of the RUI on the companion device 54 mirrors that of the RUI on the AVDD 12 and is kept synchronized therewith by the server.

Thus, by "mirror" is meant that the RUI that the server sends to the companion device 54 changes responsive to user input correspondingly to how the RUI sent by the server to the AVDD 12 changes, responsive to the same input, and vice-versa. User input on the companion device RUI thus is propagated by the server correspondingly to the RUI on the AVDD. If desired, "mirroring" may also mean that the two RUIs have the same functions when operated by a user.

In an example embodiment, the companion device 54 may use only a relatively simple hypertext markup language (HTML)-5 browser. The server bears the burden of ensuring the RUI graphics sent to the AVDD 12 and the RUI graphics sent to the companion device 54 executing the HTML5 browser are mirrored synchronously with each other. Note that if desired, the companion device 54 may be computationally lightweight and inexpensive and need not support video playback, i.e., the companion device 54 need not execute video codecs or encryption capability.

With this in mind, in example implementations the server generates HTML5-compatible graphics rendering commands to the companion device 54 that mirror the graphics rendering commands being sent to the AVDD 12, which may or may not be HTML5. In embodiments in which the RUI sent from the server to the AVDD 12 are in a low level graphics protocol such as a TCP/IP socket, HTML5 features such as Canvas and WebSocket provide for transcoding the TCP/IP low level protocol into HTML5, noting that Canvas offers full pixel level manipulation low level graphics and WebSocket replicates the behavior of TCP/IP. Note further that Websocket provides for full duplex communication over an HTTP connection, whereas Canvas provides support for bitmap graphics and vector graphics rendering.

Note further that HTML5 is a framework on top of which an application executes. On the companion device 54, the application may be referred to as a protocol application which is configured to set up a WebSocket link and receive compressed extensible markup language (XML) or JavaScript Object Notation (JSON) formatted commands, which the protocol application extracts to render HTML5 graphics. For example, the extracted commands may be a graphics vector command such as "draw a box at screen location x,y of size h,w with color c,alpha." In other words, the protocol application executing on the companion device 54, which in example implementations may be written in JavaScript, HTML, and Cascading Style Sheets (CSS), determines how to turn the RUI commands from the server into suitable HTML5 graphics.

The protocol application may be downloaded from the server to the companion device 54, bearing in mind that the server owns the other half of the protocol (i.e., serving out the compressed XML or JSON formatted commands.) However, the protocol application can be pre-loaded into the HTML5 browser of the companion device 54 at time of sale or any time prior to using the companion device 54 to control the server.

Block 76 indicates that the AVDD 12 and companion device 54 render their respective RUIs in synchronization with each other according to the respective RUI graphics commands sent to each component by the server. Thus, when a user inputs, by means of, e.g., a touch screen on the companion device 54, a selection of an element on the RUI at block 78, the companion device sends, at block 80, the selection (typically by sending the screen location of the user's touch) to the server. At block 82 the server correlates the screen location to a UI element and its function to execute the function, e.g., change channel, change volume, perform a trick play function, record, etc. The server also updates both RUIs if appropriate in synchronization with each other to keep the two RUIs mirrored with each other. Updated RUI rendering commands are sent from the server to both the AVDD 12 and companion device 54 accordingly.

Note that updating the AVDD RUI need not occur for every RUI input by a user on the companion device. For example, suppose the RUI is an electronic program guide (EPG) with many rows of channel selector elements, and six rows at a time are presented on the AVDD while only three rows at a time are presented on the companion device. If a user scrolls up one row on the companion device, causing a formerly top row to disappear, but the new bottom row and former top row of the RUI on the companion device appear within the six rows of the RUI being presented on the AVDD, the server need not command the AVDD to scroll the EPG on the AVDD for this specific case. The server maintains the session with both devices, however, updating both sessions, meaning updating the states of both RUIs, so that further scrolling by a user on the RUI of the companion device which results in new rows of the hypothetical EPG to be shown on the companion device that are not currently shown on the AVDD will cause the server to update the EPG on the AVDD to scroll accordingly, corresponding to the scroll location on the companion device. This works in the opposite direction as well, in which user input to the RUI on the AVDD is sent to the server which correspondingly changes the RUI on the companion device to remain synchronized with the RUI on the AVDD. In general, every RUI element presented on the companion device, which typically has a smaller display than the AVDD, is presented in the RUI shown on the AVDD, and if a user places a cursor focus in a RUI of one of the devices (AVDD or companion), the RUI of the other device is immediately updated by the server to present the same focus.

It may now be appreciated that the two RUIs (on the AVDD 12 and companion device 54) are linked synchronously to each other such that what the user sees on the companion device display 56 mirrors what is seen on the AVDD display 28. Note that the companion device 54 is relieved of the burden of generating the RUI and sending the RUI to the AVDD 12 since the server bears the burden of ensuring the RUI graphics sent to the AVDD 12 and the RUI graphics sent to the browser of the companion device 54 are mirrored synchronously with each other.

Note further that a user can operate the companion device 54 as a touch screen control of what he is seeing on the AVDD, which substantially improves the navigation (touch rather than pointer) and yet still allows everyone in the room to share with the selection process, just as they would with a conventional remote control. This approach is very applicable when the server is in charge of rendering each part of the graphics on the two clients at all times, without any client side composition taking place. Therefore the server can keep the rendering on multiple clients synchronized quite easily.

FIG. 3 illustrates an alternate embodiment in which the server does not transcode the RUI graphics to HTML5 for transmission to the companion device 54, but instead the transcoding task is performed by the AVDD 12. In this implementation the server would not need to know that there is a companion device at all, so no server modification is required.

Accordingly, at block 84 the companion device 54 establishes communication with the AVDD 12. At block 86 the server sends the RUI to the AVDD 12, which in turn, at block 88, transcodes the RUI for HTML5 and sends the instructions for rendering the RUI to the companion device 54. The AVDD 12 also presents the RUI on its own display, but does not yet send back to the server a message indicating that the RUI or RUI element has in fact been displayed. Thus, both devices render the RUI or RUI element at block 90, the companion device marginally later than the AVDD. When the companion device has completed rendering the RUI or RUI element, it reports this completion to the AVDD, which then reports back to the server that the RUI rendering on the AVDD is complete. Accordingly, the AVDD does not report to the server that the RUI or RUI element has been rendered immediately upon completion of rendering of the RUI or RUI element on the AVDD, but instead waits until the companion device has reported to the AVDD that the RUI or RUI element has been rendered on the companion device, at which time the AVDD reports RUI rendition to the server.

At block 92 the companion device receives a user selection. At block 94 the companion device sends the screen location of the selection to the AVDD, which relays the selection to the server. The server updates the AVDD RUI at block 96, sending it to the AVDD, which transcodes the updated RUI and sends it to the companion device 54.

FIGS. 4 and 5 show example block diagrams of a server, a companion device, and an audio video display device (AVDD, labeled "TV" in FIGS. 4 and 5 for example description). The server, AVDD, and companion device shown in FIGS. 4 and 5 may be implemented by any of the above-described corresponding appliances.

In FIG. 4, a server 100 sends RUI graphic rendering commands over a TCP/IP connection 102 to an AVDD 104, along with video to be rendered on the AVDD 104. In parallel, the server 100 sends to a HTML5 capable companion device 106 only RUI graphics rendering commands over a Websockets communication link 108, without sending video. As described above, the graphics rendering commands, which may be compressed XML or BON formatted commands, are transcoded to HTML5 by the protocol application being executed by the companion device 106 to render HTML5 graphics that mirror the RUI presented on the AVDD 104. UI commands are received by server 100 back from the companion device 106 over a link 110, with the server then propagating new RUI rendering commands to both the AVDD 104 and companion device 106 to reflect the UI commands in synchronization, to maintain the RUIs linked in a mirrored fashion.

FIG. 5 shows a system that is substantially identical to that shown in FIG. 4, except that in addition to sending RUI graphics rendering commands to the companion device 106, the server 100 also sends video to the companion device 106 for rendering of the video on the display of the companion device.

By way of example of the above principles, assume the logic of FIG. 2 (server synchronizes both RUIs) is invoked, and refer now to FIGS. 6-9. In the example shown in FIGS. 6 and 7, both the AVDD display 28 and the companion device display 56 present the same RUI, in this case, an EPG. Note that in the hypothetical shown, owing to the smaller companion device display 56, it presents only two rows of the EPG whereas the larger AVDD display 28 presents three.

Now assume that the user has touched the region of the companion device display 56 corresponding to show E, as indicating by border highlight 200 in FIG. 7. According to above principles, the companion device 54 sends the screen location of the touch to the server, which correlates the touch to a user command to present information on show E. The server executes this command by maintaining the RUIs on the both devices synchronized, in this case, by presenting show E information on both the AVDD display 28 and the companion device display 56, as shown in FIGS. 8 and 9. Because the AVDD display 28 is larger than the companion device display 56, it presents the same information as the companion device 56 and more, in this case, the name of the star of show E. Other than that, the RUIs are maintained to present identical appearances. Both RUIs include a "select now" element which if selected from the AVDD RUI using, e.g., the RC 30 or from the companion device using a touch on the display 56 cause the server to present show E on the AVDD and, when video capable and enabled for video, on the companion device as well.

Note that principles above may be applied to synchronized web pages, in which first and second devices communicate with a server which synchronizes presentation of the same web page on both devices. User activity on the web page of a first one of the devices is sent to the server, which automatically changes the web page on the other (second) device to mirror the web page being operated on by the user of the first device.

In the case when the companion device is not capable of receiving video it may receive alternatives in the blank video space. This could be occasional iframes from the video, presented just as a bitmap image. It could also be ads relevant to the user and content being watched. It could also be interactive content like voting, real time social networking, closed captions or other accessibility features that an accessibility user would need that the others in the room would not.

While the particular AUTOMATIC DISCOVERY AND MIRRORING OF SERVER-CLIENT REMOTE USER INTERFACE (RUI) SESSION ON COMPANION DEVICE AND SYNCHRONOUSLY CONTROLLING BOTH SESSIONS USING RUI ON COMPANION DEVICE as herein shown and described in detail, it is to be understood that the subject matter which is encompassed by the present invention is limited only by the claims.

What is claimed is:

1. A device comprising:
   at least one computer memory that is not a transitory signal and that comprises instructions executable by at least one processor of a companion device to an audio video display device (AVDD) to:
   receive from a server information pertaining to rendering a remote user interface (RUI), a version of which is presented on the AVDD, display locations on the RUI presented on the companion device being selectable by a user to send information correlatable to control commands for the AVDD to cause the AVDD to execute respective functions, a control command generated using the RUI on the companion device causes execution of at least one of: change a source of video for presentation of the video on the AVDD, change volume output by the AVDD, perform a trick play function on the AVDD, record a video presented on the AVDD; and
   receive from the server updates to the RUI such that the RUI presented on the companion device is synchronized with the version presented on the AVDD, wherein
   the instructions are executable to receive, from the server, the information pertaining to rendering the RUI in a low level graphics card protocol via a transmission control protocol/Internet Protocol (TCP/IP) socket, the information pertaining to rendering the RUI defining how to render RUI elements of the RUI but not defining functionality of the RUI elements, such that selection of an RUI element causes sending a signal back to the server indicating a screen location at which the selection occurred, which the server then correlates to the appropriate function underlying the selected RUI element.

2. The device of claim 1, wherein the instructions are executable to receive the information pertaining to rendering the RUI formatted for rendering the RUI in a hypertext markup language that supports graphics rendering commands using vector graphics, in addition to bitmap graphics commands.

3. The device of claim 1, wherein the RUI on the AVDD is not in HTML5.

4. The device of claim 1, wherein the instructions are executable to present the RUI on the companion device modified from the version presented on the AVDD as appropriate for a display of the companion device.

5. The device of claim 1, wherein the instructions are executable to establish communications with the server.

6. The device of claim 1, wherein the instructions are executable to establish communications only with the AVDD and not with the server, the instructions being executable such that the server information pertaining to rendering the RUI is received through the AVDD by the companion device.

7. The device of claim 1, wherein the instructions are executable to execute, on a base established by a hypertext markup language that supports graphics rendering commands using vector graphics, in addition to bitmap graphics commands, a protocol application which transcodes the information pertaining to rendering the RUI to graphics on the base.

8. The device of claim 1, wherein the information pertaining to rendering the RUI received by the companion device includes extensible markup language (XML) commands and/or JavaScript Object Notation (JSON) formatted commands.

9. Server comprising:
   at least one computer memory comprising instructions executable by at least one processor to:
   send to an audio video display device (AVDD) at least one graphics rendering command to render, on a display of the AVDD, a remote user interface (RUI) containing at least one RUI element, the graphics rendering command to render the RUI being sent in a low level graphics card protocol via a transmission control protocol/Internet Protocol (TCP/IP) socket, such that the graphics rendering command to render the RUI defines how to render RUI elements of the RUI but does not define underlying functionality of the RUI elements, such that selection of an RUI element causes sending a signal back to the server indicating a screen location at which the selection occurred, which the server then correlates to the appropriate function underlying the selected RUI element;

in synchronization with sending the graphics rendering command to the AVDD, send to a companion device at least one corresponding graphics rendering command that causes the companion device to render the RUI or a substantially similar version thereof on a display of the companion device, the substantially similar version presented on the companion device being a version of the RUI presented on the AVDD modified for presentation capabilities of the companion device;

receive from the companion device at least one user selection signal pertaining to the RUI;

correlate the user selection signal to a control command;

at least some of the time, responsive to the user selection signal from the companion device, automatically send a graphics rendering command to the AVDD to cause the AVDD to modify the RUI presented thereon such that the RUI on the AVDD is synchronized with the RUI on the companion device.

10. The server of claim 9, wherein the instructions are executable to send at least one modified RUI rendering command to the AVDD and a corresponding at least one modified RUI rendering command to the companion device such that the RUI presented on the companion device mirrors the RUI presented on the AVDD.

11. The server of claim 9, wherein the instructions are executable to send at least one graphics rendering command to the companion device in a format suitable for rendering the RUI in an HTML5 environment.

12. The server of claim 9, wherein the instructions are executable to send at least one graphics rendering command to the AVDD using a low level graphics card protocol via a transmission control protocol/Internet Protocol (TCP/IP) socket.

13. The server of claim 9, wherein the instructions are executable to send at least one graphics rendering command to the companion device in extensible markup language (XML) format or JavaScript Object Notation (JSON) format.

14. Method comprising:

receiving, at an audio video display device (AVDD) and a companion device paired with the AVDD, graphics rendering commands to render on each device a respective remote user interface (RUI), the graphics rendering command to render the RUI being sent in a low level graphics card protocol via a transmission control protocol/Internet Protocol (TCP/IP) socket, such that the graphics rendering command to render the RUI defines how to render RUI elements of the RUI but does not define underlying functionality of the RUI elements, such that selection of an RUI element causes sending a signal back to the server indicating a screen location at which the selection occurred, which the server then correlates to the appropriate function underlying the selected RUI element; and receiving, at both the AVDD and companion device, respective RUI modification commands to change the respective RUIs in synchronization with each other, both RUIs for generating control commands to control presentation on the AVDD.

15. The method of claim 14, comprising generating the respective RUI modification commands by a server in response to user input on the companion device.

16. The method of claim 14, comprising formatting the respective RUI modification commands differently from each other.

17. The method of claim 14, comprising sending the RUI modification command to the companion device in a format suitable for rendering the RUI in an HTML5 environment.

18. The method of claim 14, comprising sending the RUI modification command to the companion device in extensible markup language (XML) format or JavaScript Object Notation (JSON) format.

19. The method of claim 14, comprising sending the RUI modification command to the AVDD in a low level graphics card protocol via a transmission control protocol/Internet Protocol (TCP/IP) socket.

20. The method of claim 14, comprising relieving the companion device of generating the RUI and sending the RUI to the AVDD since a server bears the burden of ensuring RUI graphics sent to the AVDD and RUI graphics sent to the companion device are mirrored synchronously with each other.

* * * * *